United States Patent [19]

Laurent et al.

[11] Patent Number: 5,043,042

[45] Date of Patent: Aug. 27, 1991

[54] COMPONENT ELEMENTS OF AN APPARATUS FOR THE MANUFACTURE OF A TIRE REINFORCEMENT

[75] Inventors: Daniel Laurent, Meylan; Jean-Luc Laurent, Chatel-Guyon, both of France

[73] Assignee: Compagnie Generale des Etablissements Michelin-Michelin et Cie, Cedex, France

[21] Appl. No.: 565,886

[22] Filed: Aug. 9, 1990

Related U.S. Application Data

[63] Continuation of Ser. No. 314,909, Feb. 24, 1989, abandoned.

[30] Foreign Application Priority Data

Mar. 7, 1988 [FR] France .................................. 88 03005

[51] Int. Cl.⁵ ............................................. B29D 30/38
[52] U.S. Cl. ..................................... 156/397; 156/403
[58] Field of Search ................ 156/397, 117, 429–432, 156/439, 440, 403; 242/147 R; 28/101, 102; 66/84 R, 84 A

[56] References Cited

U.S. PATENT DOCUMENTS

| | | |
|---|---|---|
| 852,855 | 5/1907 | Sloper . |
| 1,259,997 | 3/1918 | Kline . |
| 1,321,402 | 11/1919 | Stowe . |
| 1,328,006 | 1/1920 | McLeod . |
| 1,349,390 | 8/1920 | Swinehart . |
| 2,139,840 | 12/1938 | McKone . |
| 3,602,965 | 9/1971 | Burger ................... 28/101 |
| 3,674,584 | 7/1972 | Klein .................. 156/397 X |
| 4,172,748 | 10/1979 | Petzetakis .......... 28/101 X |
| 4,206,009 | 6/1980 | Kazares . |
| 4,277,295 | 7/1981 | Schmidt et al. . |
| 4,370,183 | 1/1983 | Albo . |
| 4,401,493 | 8/1983 | Bailey et al. . |
| 4,409,059 | 10/1983 | Holyroyd et al. . |
| 4,795,523 | 1/1989 | Laurent et al. . |
| 4,801,344 | 1/1989 | Laurent et al. . |

FOREIGN PATENT DOCUMENTS

| | | |
|---|---|---|
| 0009018 | 3/1980 | European Pat. Off. . |
| 1291112 | 3/1969 | Fed. Rep. of Germany . |
| 0048833 | 7/1940 | Netherlands ........... 156/397 |
| 8302749 | 8/1983 | PCT Int'l Appl. . |

*Primary Examiner*—Geoffrey L. Knable
*Attorney, Agent, or Firm*—Brumbaugh, Graves, Donohue & Raymond

[57] ABSTRACT

The elements described refer to an apparatus for the manufacture of a tire reinforcement from a single cord. Each lever 2 of the apparatus is provided at its end with a groove 3 which describes a partial oval. The cord is hooked therein. A recess 28 serves as a template for the installation of a bead wire.

13 Claims, 8 Drawing Sheets

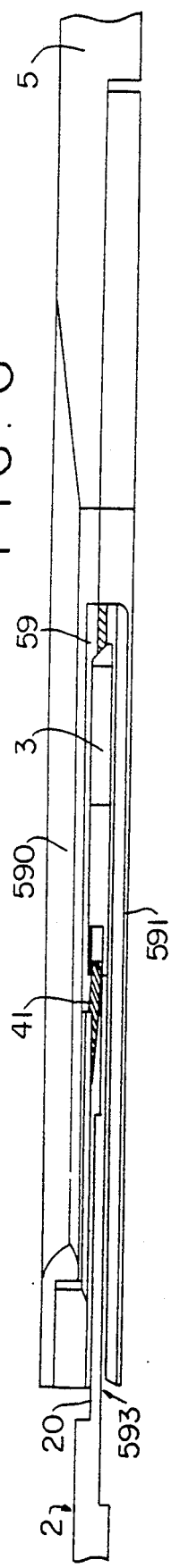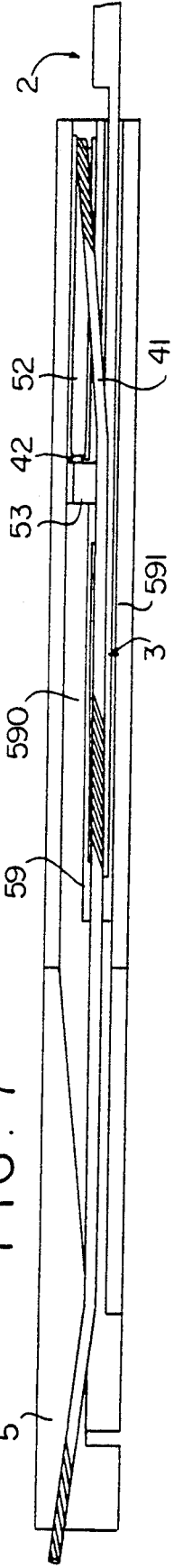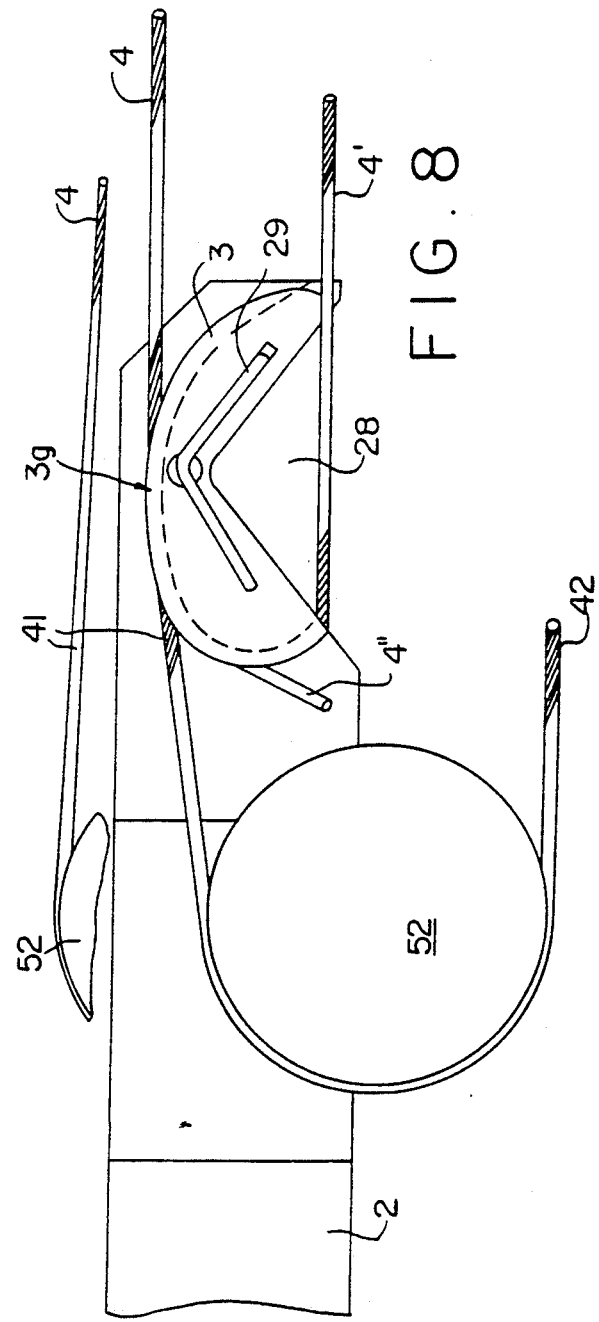

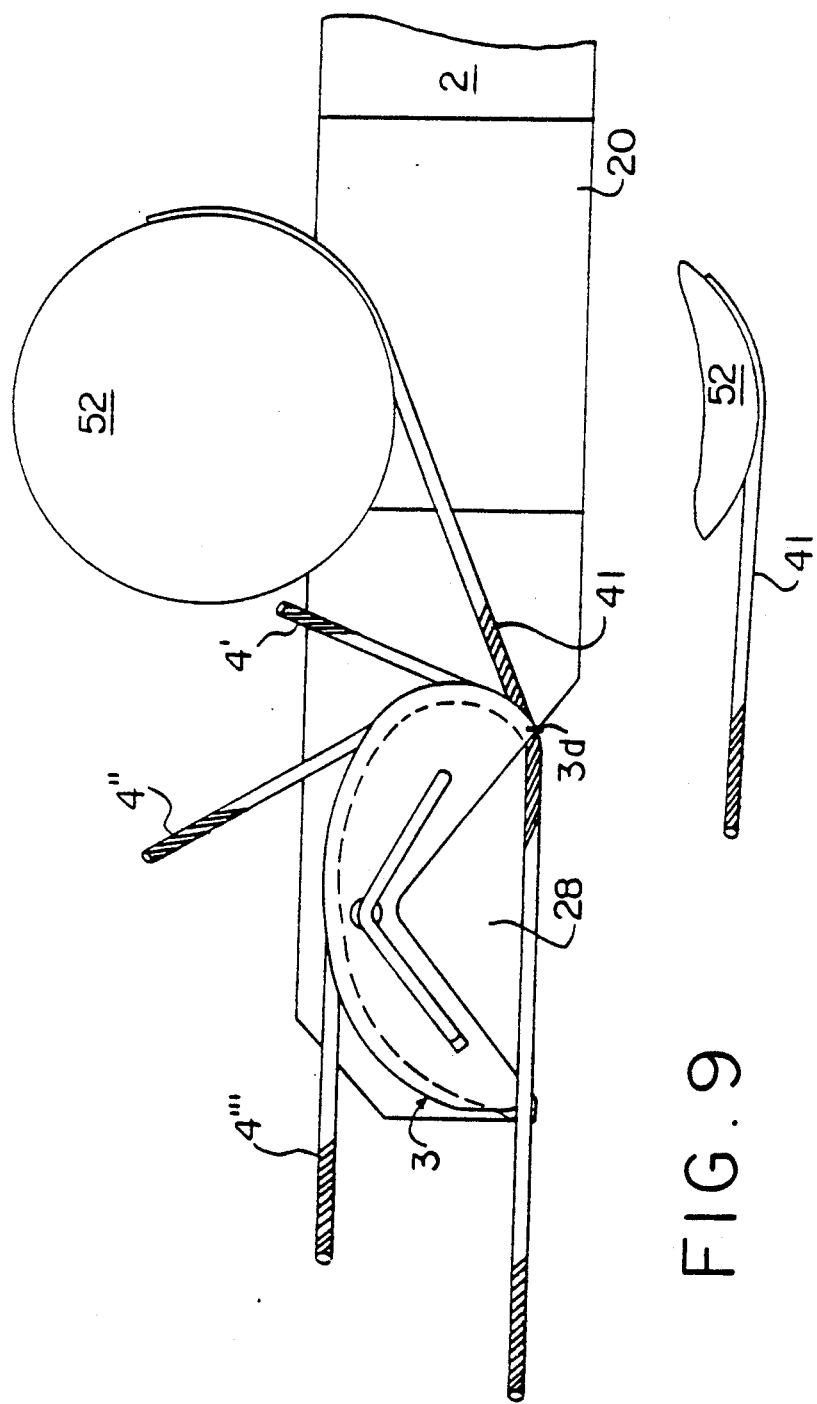

COMPONENT ELEMENTS OF AN APPARATUS FOR THE MANUFACTURE OF A TIRE REINFORCEMENT

This application is a continuation of application Ser. No. 314,909, filed on Feb. 24, 1989, now abandoned.

BACKGROUND OF THE INVENTION

The present invention concerns the manufacture of tires. It relates to the type of apparatus described in U.S. Pat. No. 4,795,523, issued Jan. 3, 1989, which is incorporated herein by reference.

Such an apparatus is intended for the manufacture of tire reinforcements from a single cord. Among its essential members this apparatus comprises means for retaining the cord which are borne by levers referred to in said patent by the term "support arm". This apparatus also has means for presenting the cord to the retention means. In the examples described, these presentation means are formed by a rotary arm which assures the unwinding and the hooking of the cord to the retention means; the retention means for the cord are formed by a pair of hooks, and the cord is unwound from an orifice located at the end of the rotary arm.

The object of the present invention is to propose novel retention means and novel cord presentation means which are particularly well suited (although this is not limitative) when using a rather stiff cord, such as, for example, a metal cable.

In accordance with the invention, a cord retaining means for a tire manufacturing apparatus, said apparatus being of the type having two coaxial rings of levers, the ends of which bear the said retaining means, is characterized by the fact that it essentially defines a groove limited by two lips, the bottom of said groove defining an unclosed curve.

For an understanding of the principle of manufacture used in the present invention and for the general configuration of the manufacturing apparatus, reference can be made to the disclosure of said patent.

The following figures show in detail the specific means of the present invention, namely:

FIG. 1 is a face view of a lever provided with a retention means;

FIGS. 2 and 3, respectively, are face and edge views of the lever which show the retention means of the present invention in detail;

FIGS. 4 and 5, respectively, are face and edge views of the rotary arm equipped with the presentation means of the present invention;

FIGS. 6 to 9 show the presentation of the cord to the retention means; and

In the present patent application, the expression "cord" is to be understood in its broadest sense as designating the filiform reinforcement material, whether monofilament or multifilament, twist, cable, etc. The present invention, while of very broad possible application, is specifically suited for the use of cords, such as metal reinforcement cables, that is to say cords, which cannot be subjected to a bend of small radius without undergoing permanent deformation.

Figure 1:
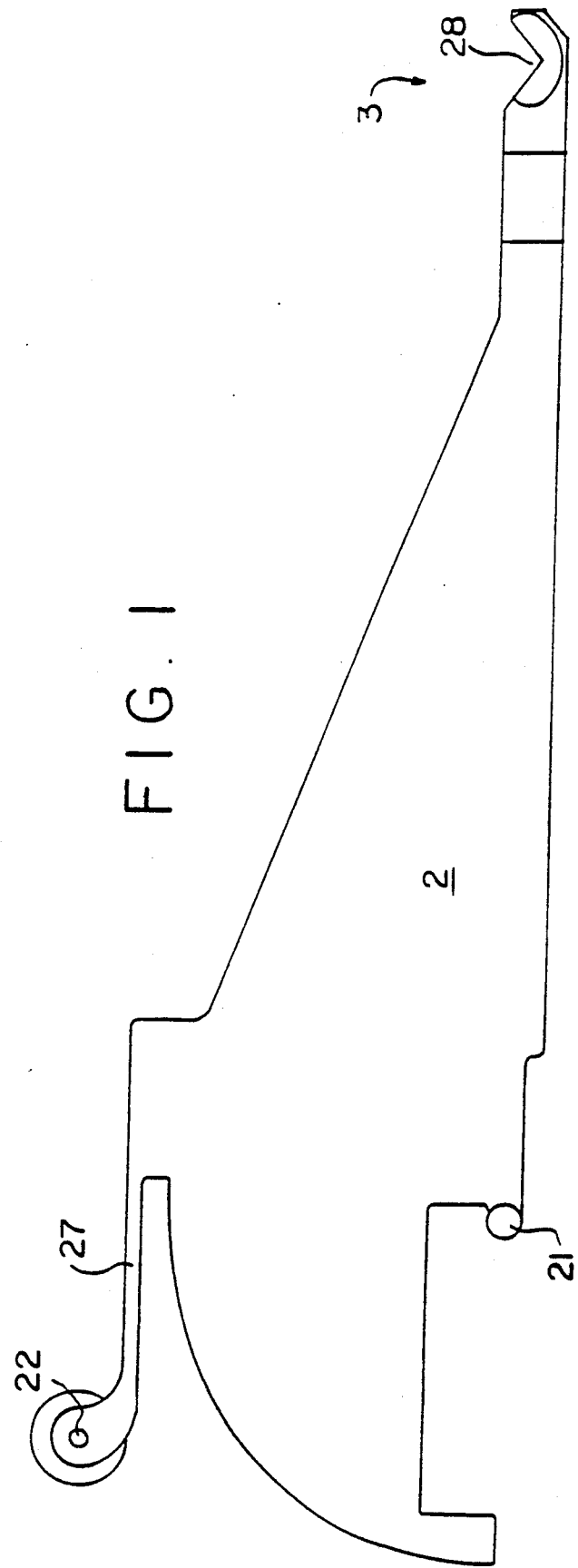
Figure 2:
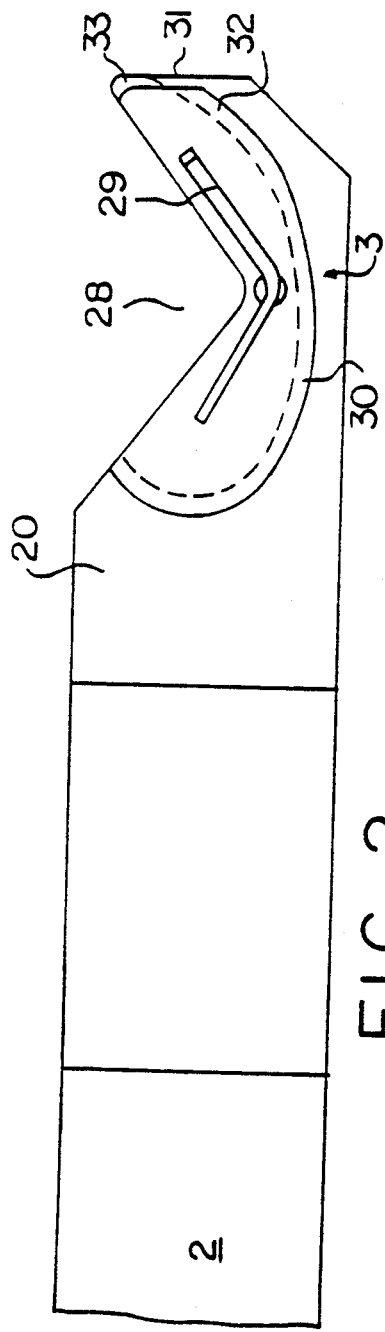
Figure 3:
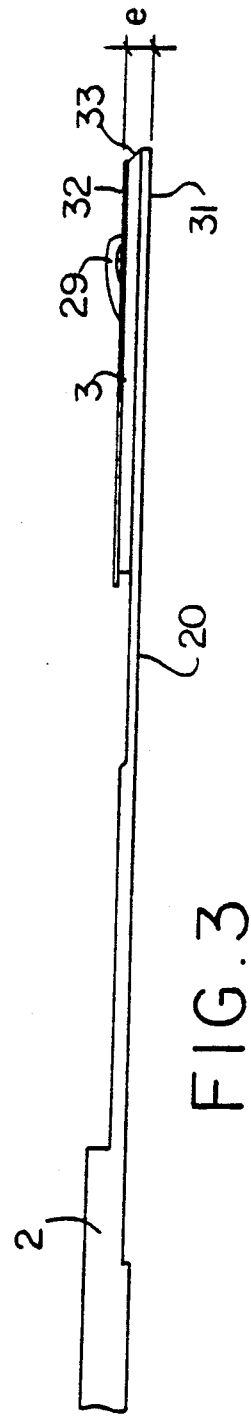

FIG. 1 shows a lever 2 which, as disclosed in the aforementioned patent, has a point of articulation 21 and a drive point 22. At its end, it bears cord retention means. There is provided essentially a groove 3 defined between two lips 31 and 32 (see FIGS. 2 and 3). But it could also be a plurality of small hooks or spurs (at least three) disposed so as to form and define a groove limited by two lips which, provided that the tension of the cord is controlled, can fulfill an equivalent function. Thus the cord 4 can engage on the groove 3 as it would around a pulley. In order to avoid harmful permanent deformations, it is sufficient to maintain the radius of curvature of said groove 3, in the plane of winding of the cord 4, above a limit value which depends directly on the characteristics of the cord 4 used.

In order to guarantee good retention of the cord 4 by the groove 3, the latter is advantageously oriented radially to the axis of the respective ring. If a radial carcass reinforcement is being manufactured, the cord 4 of the reinforcement must be oriented substantially radially. In order to be able to anchor the cord reinforcement to the tire core, a bead wire is threaded through loops formed for this purpose in the cord reinforcement. In order for this threading to be possible, this loop must be arranged substantially radially. Therefore, the groove 3 which assures the retention of the cord 4, in the same way as the hooks in the aforementioned patent, also assures that the formation of a loop is oriented substantially radially (see FIG. 10). This groove 3 must, at the time of the hooking of the cord 4 by the rotary arm 5, have a suitable orientation, with due consideration to the folding movement around the core, as shown in FIGS. 10 to 16 and as explained in the said patent.

The bottom 30 of the groove 3 defines an unclosed planar curve contained in a substantially radial plane. It is unnecessary for the curve to be closed because during the folding movement, shown in FIGS. 10 to 16, the cord 4 rests on the groove 3 over an arc of less than 360 degrees.

The mechanical connection between the groove 3 and the corresponding lever 2 is effected in very simple manner: the extension 20 at the end of the lever 2 constitutes one of the lips of the groove 3, namely, the lip 31. This extension 20 is formed by a radial flat plate, just like the lever 2 itself.

In order to assure the anchoring of the reinforcement to a bead wire, the end of each of the levers 2 has a recess 28 formed therein to serve as a template for the installation of the bead wire. The curve defined by the bottom 30 of the groove 3 has the general shape of a partial oval which encompasses the recess 28. The anchoring of the reinforcement will be explained in greater detail when describing the final phase of operation of the apparatus.

Figure 5:
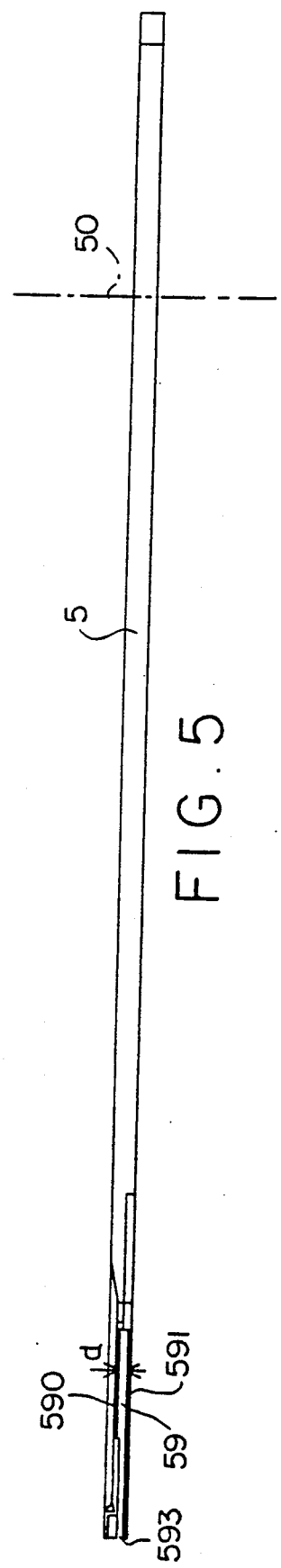
Figure 4:
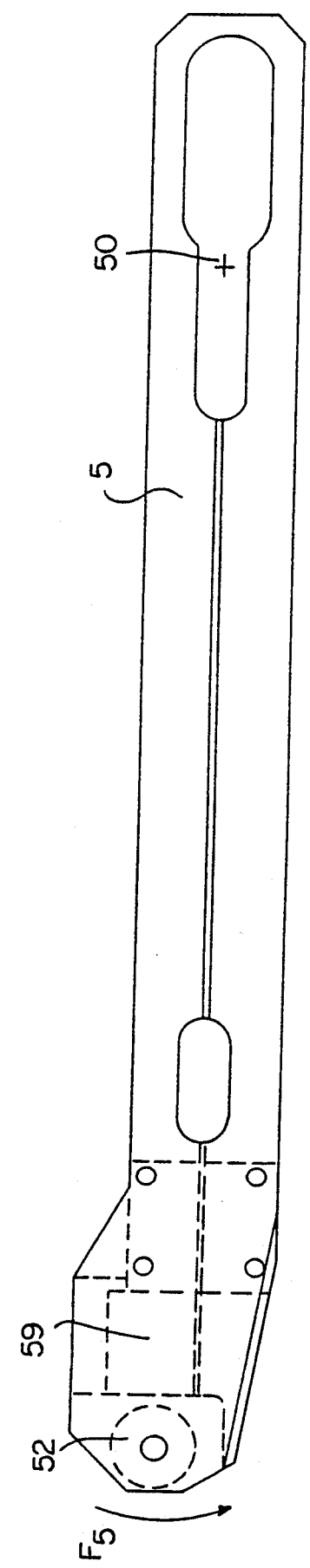

A rotary arm 5, shown in FIGS. 4 and 5, assures the unwinding and hooking of the cord 4 to the grooves 3. This rotary arm 5 rotates on an axis 50 in the direction indicated by the arrow F5. The rotary arm has at its end presentation means specially designed to be used with the retention means 3 described above. An embodiment of the presentation means will now be described.

The assembly formed by the cord retention means and a cord presentation means for a tire manufacturing apparatus, said apparatus being of the type having two coaxial rings of levers, the ends of which bear the retention means as described above, is characterized by the fact that the presentation means has the shape of a fork formed by two flat elements 590 and 591, extending parallel to the movement of the said presentation means and separated from each other by the thickness "e" of the retention means 3, the cord 4 being fed and unwound by one of the two flat elements.

In order to facilitate the unwinding of the cord 4, this rotary arm 5 also has a return pulley 52 located in a plane perpendicular to the axis of rotation 50 of the rotary arm 5 and, therefore, in the plane of movement of the presentation means. Within the fork, between the flat elements 590 and 591, there is a passage 59 for the groove 3. This passage 59 is disposed between the return pulley 52 and the axis of rotation 50.

In a manner similar to that which has been described with regard to the curvature of the groove 3, the radius of the return pulley 52 must be sufficient not to impart permanent deformations to the cord 4. The use of a pulley rather than a groove or equivalent curved conduit makes it possible to avoid wear by friction at a place where the contact pressure of the cord 4 on the unwinding member is substantial.

Upon emerging from unwinding, the ramp 53 (FIG. 7) conducts the strand 41 of the cord 4 out of the plane of rotation of the strand 42 located between the axis of rotation 50 and the pulley 52. The strand 41 is confined between the flat elements 590, 591, which permits the dependable hooking of the cord within the groove 3.

Due to this fork shaped presentation means, the presentation of the cord 4 to each groove 3 is very precise. Effective hooking is guaranteed by the small amount of play present between a groove 3 and each flat element 590 and 591 when a groove 3 is present between them. These flat elements 590 and 591 are separated from each other by a distance which is slightly greater than the thickness "e" of the retention means, namely, in the embodiment described, the cumulative thickness of the groove 3 and the lips 31 and 32 limiting it. It is to be noted that the spur 29, the purpose of which will become evident further below, is retracted into the thickness of the end of the lever 2 upon the passage of the groove within the fork. This spur, therefore, adds nothing to the thickness "e" in question. The clearance (d-e) is in all cases less than the diameter of the cord 4 so that the latter cannot escape from the groove 3 when the latter passes through the passage 59. The return pulley 52 is supported by the flat element 590. The passage 59 for the groove 3 lies between the flat elements 590 and 591 and alongside the pulley 52. Between the pulley 52 and the element 591 forming a counterpart, there is a slot 593 for the passage of the lever 2 when it is in its fully extended position.

the retention means on each of the two axially opposite rings must be compatible with the unwinding means of the rotary arm 5, of which there is only one. This is why the ends of levers 2 of the left-hand ring (FIGS. 6, 7, 8 and 10) and those of the right-hand ring (FIG. 9) are symmetrical with respect to a plane perpendicular to the axis of the rings (shown in FIG. 10) and comprising the axis of rotation 50 of the rotary arm 5. Therefore, the levers 2 are not interchangeable between the left-hand and right-hand rings, the position of the groove 3 with respect to the plate constituting the extension 20 of the lever 2 being inverse in one ring to what it is in the other. Therefore, the hooking of cord 4 on a groove 3 on the left (where the presentation of the cord 4 takes place while the rotary arm moves away radially from the axis of the rings) starts on the median zone 3g of the groove 3, while on the other side (where the presentation of the cord 4 takes place while the rotary arm radially approaches the axis of the rings), the hooking starts on the terminal zone 3d of the groove 3. The shape of the groove 3 is, however, identical on the left and right, as well as the presence of a recess 28 on each side, these characteristics being dictated primarily by the sequence of the performance of the manufacturing process. The reference numbers 4', 4", 4''' indicate successive positions assumed by the cord 4 when it is hooked to the grooves 3.

Figure 10:
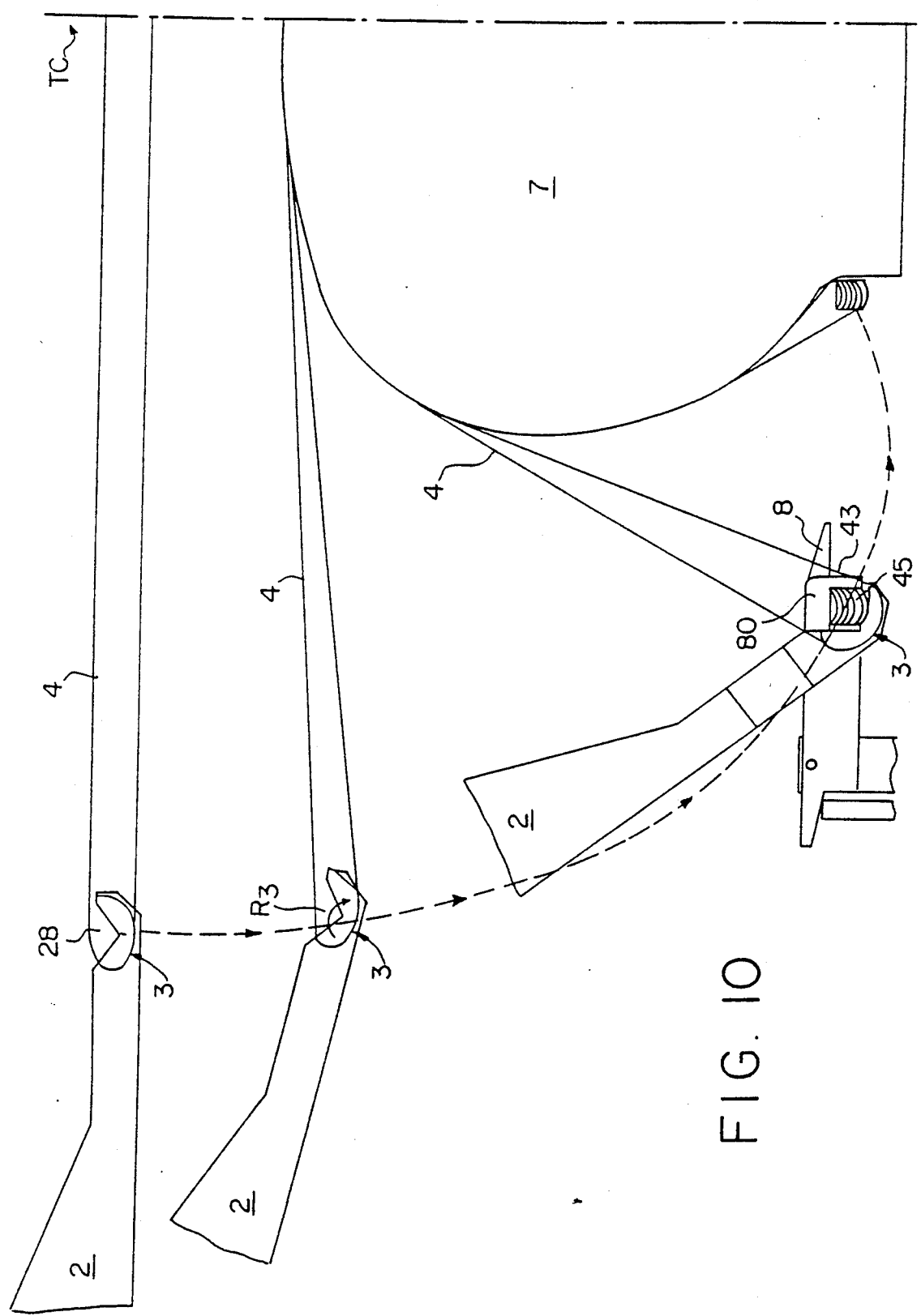
FIGS. 10 to 16 illustrate how the levers fold the cord around the core of a tire.
Figure 11:
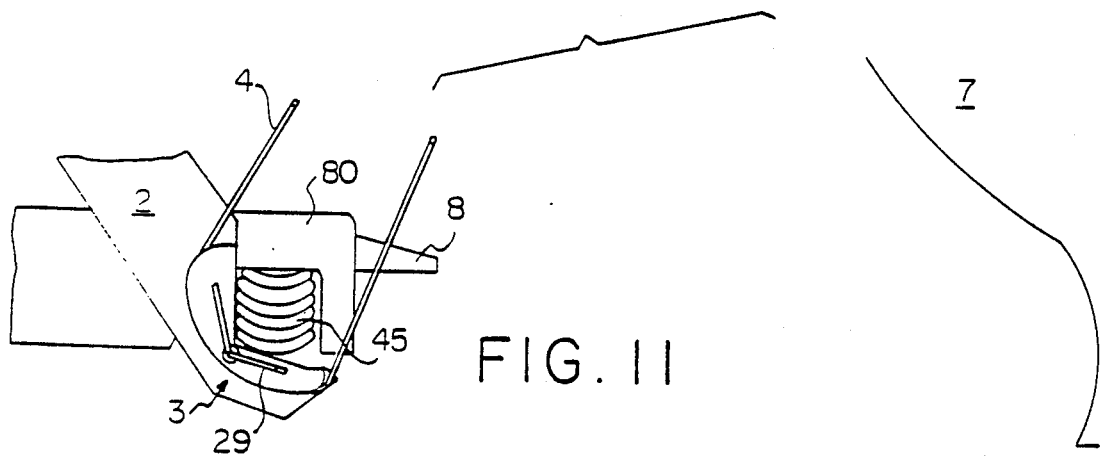

The folding of the cord 4 on and around a core 7 is accomplished by the movement of the levers 2 through the sequence of positions shown in FIG. 10. Up to this stage, the lips 31 and 32 must insure the retention of the cord 4 on the grooves 3. A bead wire 45 is installed by threading through several holes of a suitable profiled member, as explained in the aforementioned patent, while resting against the template formed by the recesses 28 and also against the blades 8 delimiting the outer radius of the future bead wire, as well as fingers 80 which, on the axial inner side, close off the space in which the bead wire 45 is inserted.

The groove 3 must then permit the unhooking of the cord 4 via the continuation alone of the movement of axial approach of the ends of the levers 2 toward the core 7. For this purpose, the lip 32 (the one located on the side of the groove 3 opposite the attachment thereof on the lever 2) progressively decreases in height to the very end of the lever 2. This is effected by a bevel 33 shown in FIGS. 2 and 3, which permits the unhooking of the cord 4 without need of a relative movement (in the axis of the core) between the bead wire 45 and the retention means formed by the grooves 3.

By way of reminder, the tilting movement of the levers 2 results from the combined action of the drive of the axial displacement of all the articulation points 21, a pressure on the drive points 22 and the tension reaction of the cord 4. Upon continuing the approach towards the core 7, the axial approach of the groove 3 is accompanied by a radial movement towards the axis of the rings of levers 2. There results from this a rotation R3 of the groove 3 with respect to the orientation of the cords 4 (see FIGS. 10 to 14). The strand 43 of the cord 4 then engages on the bevel 33 which pushes the cord 4 to leave the groove 3. At this stage it is preferable to maintain the tension in the strands of cord 4. Now, this cannot yet result from the resting of the cords 4 on the bead wire 45, since the latter is not in its final position against the core 7. The length of the strands of the cord 4 is therefore excessive at the time of the unhooking of the cord 4. The tension of the cord 4 is maintained by a spur 29 which retains the cord 4 in cooperation with the end of the adjacent lever 2. The intervention of the spur 29 is clearly evident from FIG. 14.

Figure 12:
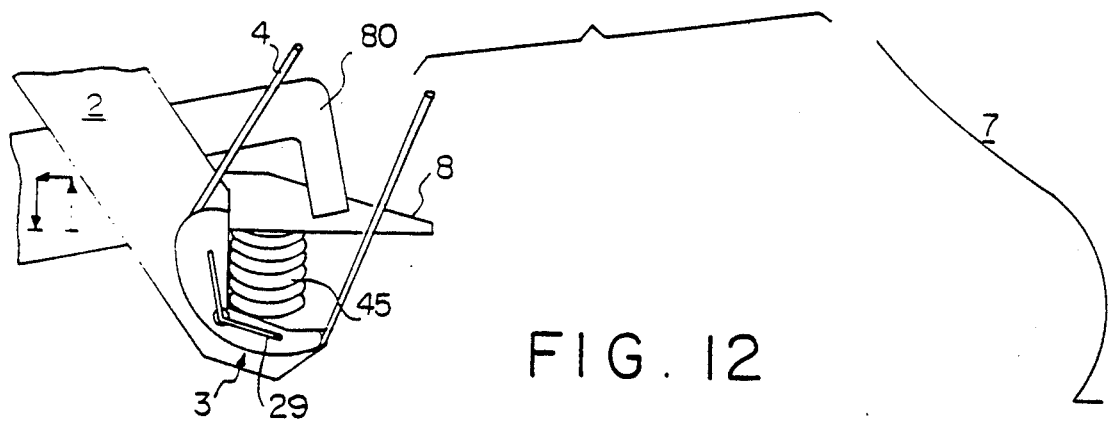
Figure 13:
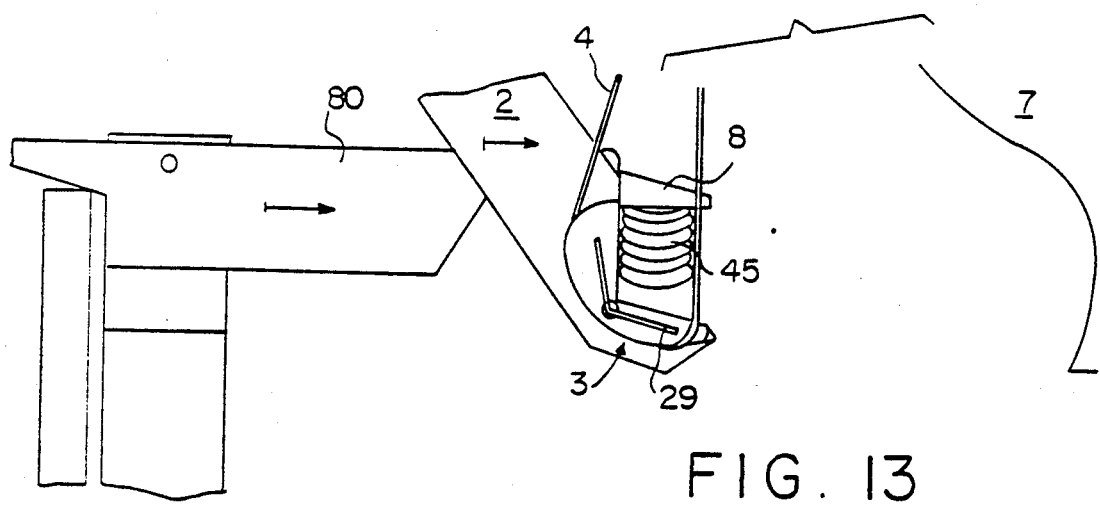
Figure 14:
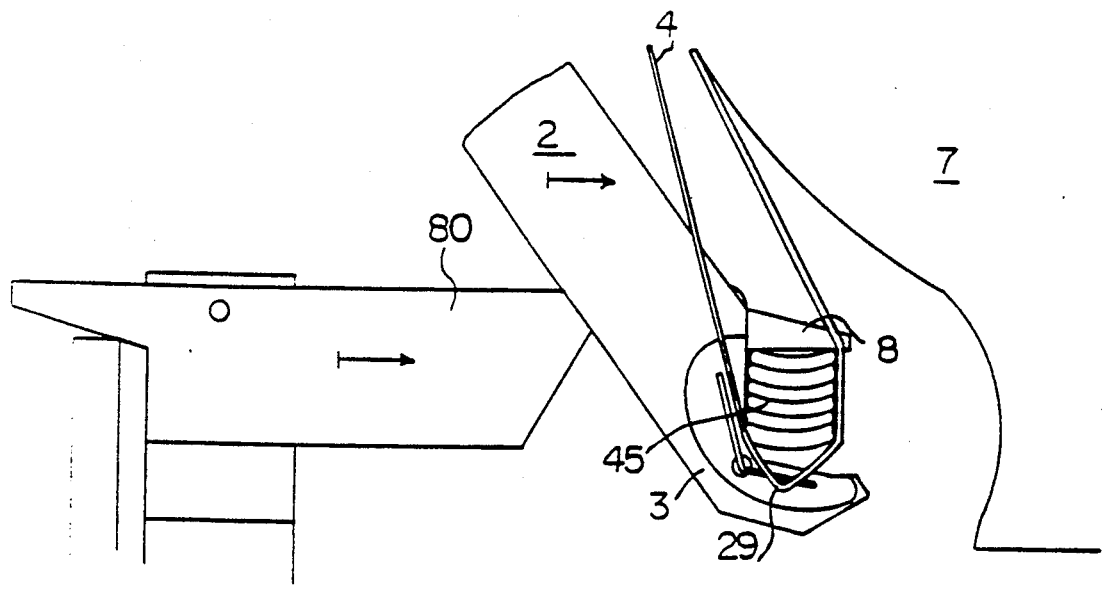
Figure 15:
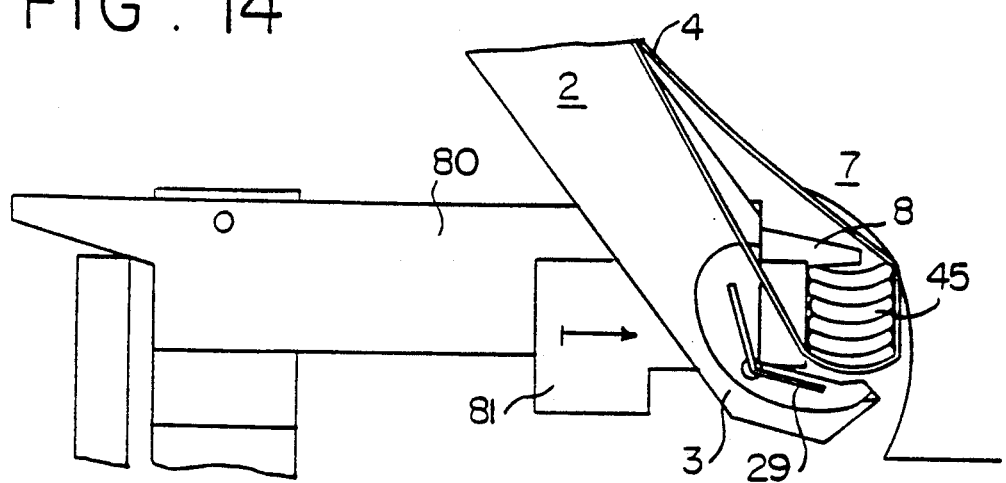
Figure 16:
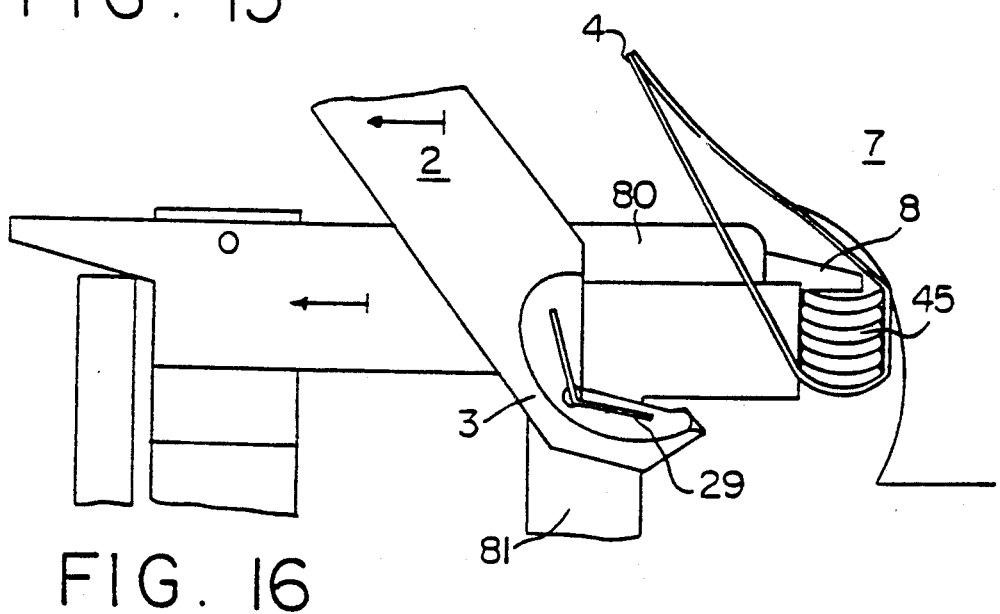

The bead wires 45 are freed from the levers 2 and pushed towards the core 7 by the flanges 81 (FIGS. 15 and 16), due to a relative axial movement of said flanges 81 with respect to the levers 2. Previously, in order to be able to push the bead wires 45 up against the core 7, the fingers 80 are passed axially on the outside of the bead wires 45, as shown in FIG. 12. FIGS. 10 to 16 clearly show all the movements of the different members, indicated diagrammatically by the arrows.

A certain flexibility should be imparted to the tilting movement of the levers 2. An elastic element forming a spring 27 can be inserted between the body of the lever 2 and the drive point 22 (FIG. 1).

In order better to guide the anchoring of the cord 4 on the rubber covering the core 7 upon the folding movement, the distance between two adjacent strands of the cord 4 retained by the same groove 3 can be regulated by inclining the end of said groove 3 in the peripheral direction by an amount corresponding to at most one half of the distance between two adjacent retention means. Otherwise, the strands of cord 4 leaving the groove 3 on both sides thereof have a tendency to remain in the same meridian plane and to be juxtaposed with each other.

In order to facilitate an understanding of the invention, the figures use the same reference numbers as those used in the aforementioned patent when the object designated is identical or at least has a similar function.

We claim:

1. In a tire manufacturing apparatus having two coaxial rings of levers, the ends of which bear retention means, and cord presentation means with which a reinforcing cord is looped back and forth between the retention means of each ring, the levers of each ring being movable radially and axially to apply the cord reinforcement on a tire core placed between the two coaxial rings of levers, the improvement wherein said retention means comprises a pair of lips, a curved groove recessed between the lips, the curved groove forming an unclosed curve for receiving a loop of the cord and retaining the loop in curved open condition and a recessed surface encompassed by the unclosed curved groove forming an opening through the retention means and within the open loop retained thereon, the span of the retained cord across the opening at the unclosed portion of the curve being unsupported by the groove.

2. The apparatus of claim 1, wherein said curve is contained within a plane substantially radial to the axis of the ring.

3. The apparatus of claim 1, wherein said curve has the general shape of a spiral.

4. The apparatus of claim 1, wherein said curve has the general shape of a partial oval.

5. The apparatus of claim 1, wherein an extension of each lever lies in a plane oriented radially and forms one of the lips adjacent the curved groove.

6. The apparatus of claim 5, wherein the recessed surface is on the radially outer side of the cord retention means and serves as a template for the installation of a bead wire for the anchoring of the reinforcement cord.

7. The apparatus of claim 6, wherein the curve formed by said groove has the general shape of a partial oval and said opening formed by said recess surface is located within the partial oval formed by the said groove in such a manner that the groove partially surrounds the template on the radially inner side.

8. The apparatus of claim 1, wherein at the terminus of the lever, one of said lips is spaced from the lever by the curved groove and in which said one lip progressively decreases in height to facilitate release of the loop.

9. The apparatus of claim 1, wherein at the terminus of the lever, the groove is inclined in the peripheral direction by an amount corresponding to at most one half of the distance between two adjacent retention means.

10. The apparatus of claim 1, having a spring forming an elastic element through which movement is imparted to the lever.

11. The apparatus of claim 1, wherein the presentation means has the shape of a fork formed by two flat elements which are parallel to the movement of said presentation means, separated from each other by the thickness of the retention means plus a slight clearance, the cord being fed and unwound by one of the two flat elements.

12. An apparatus according to claim 11, wherein said flat element by which the cord is fed comprises a return pulley for the cord.

13. Apparatus for constructing a cylindrical cord reinforcement for a tire core by cord presentation means looping the cord back and forth between cord retention means arranged in two circular arrays around a common axis, said apparatus including a cord retention means arranged in two circular arrays around a common axis and a cord presentation means, the cord retention means comprising a support having a cord retention end, an unclose curved groove carried at the cord retention end of said support to receive and retain an open loop of cord from said presentation means and means defining a recess encompassed by the unclosed curved groove and adapted to receive a bead wire through the open loop of cord retained by the unclosed curved groove, the span of the retained cord across the recess at the unclosed portion of the curve being unsupported by the groove, the presentation means comprising a rotary support for looping the cord back and forth between the two circular arrays of cord retention means, and a rotatable pulley carried at the end of the rotary support for looping the cord within said unclosed curved groove of the retention means as the pulley moves relative to the unclosed curved groove.

* * * * *

UNITED STATES PATENT AND TRADEMARK OFFICE
CERTIFICATE OF CORRECTION

PATENT NO. : 5,043,042

DATED : August 27, 1991

INVENTOR(S) : Daniel Laurent et al.

It is certified that error appears in the above-identified patent and that said Letters Patent is hereby corrected as shown below:

On Title Page, item [73]; 3rd line, "Cedex" should read --Clermont-Ferrand Cedex--;

Column 3, line 44, "counterpart" should read --counterplate--;

Column 5, line 46, "recess" should read --recessed--.

Signed and Sealed this

Ninth Day of March, 1993

*Attest:*

STEPHEN G. KUNIN

*Attesting Officer*   *Acting Commissioner of Patents and Trademarks*